March 13, 1962 A. SCHALLIS 3,025,144
CARBON DISULFIDE RETORT
Filed Aug. 31, 1959
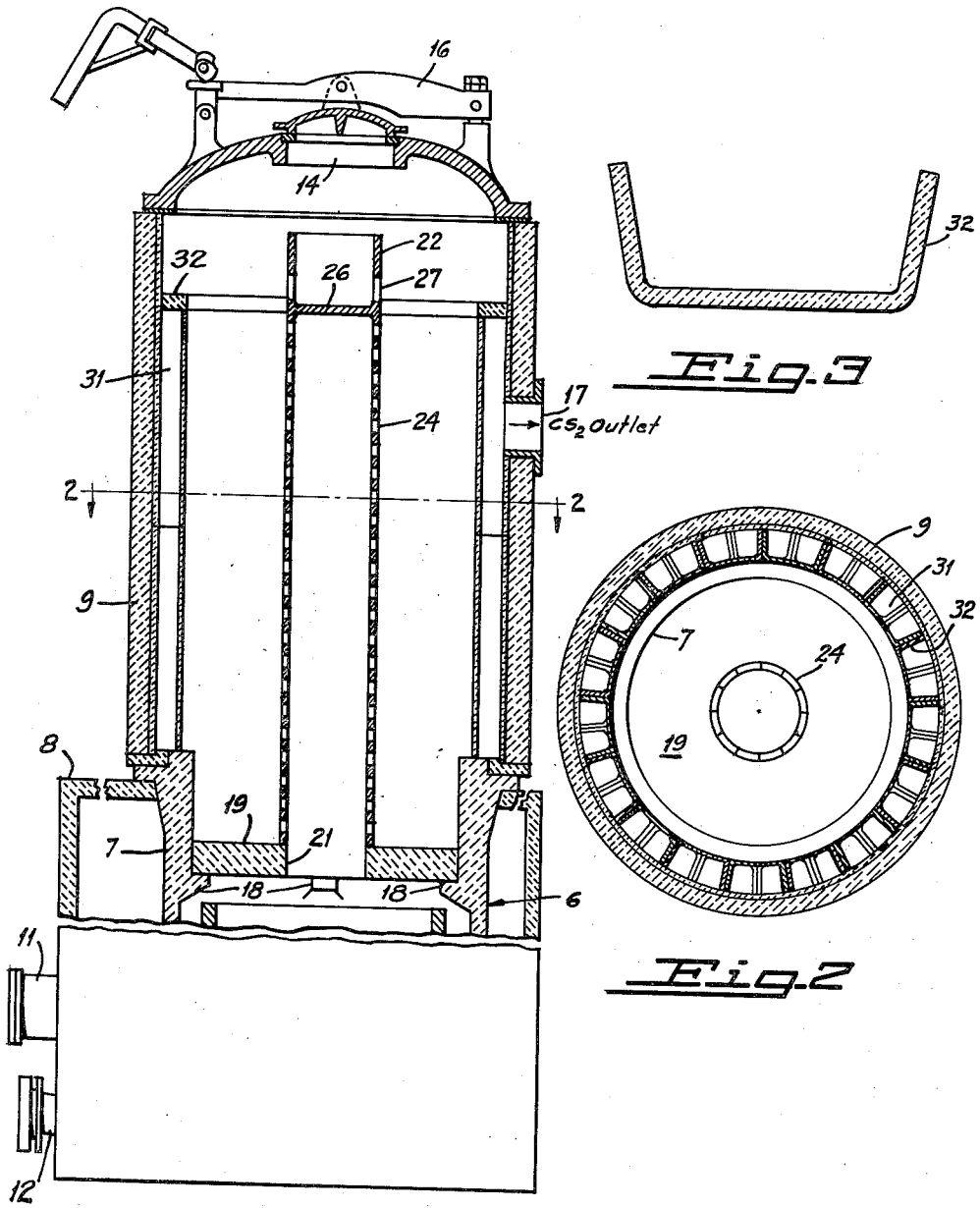
INVENTOR.
ALVIN SCHALLIS
ECKHOFF & SLICK
ATTORNEYS
BY
A member of the firm

United States Patent Office 3,025,144
Patented Mar. 13, 1962

3,025,144
CARBON DISULFIDE RETORT
Alvin Schallis, Irvington on Hudson, N.Y., assignor to Stauffer Chemical Company, a corporation of Delaware
Filed Aug. 31, 1959, Ser. No. 837,012
1 Claim. (Cl. 23—284)

This invention relates to an improved retort for the manufacture of carbon bisulfide and particularly those intended for use upon coke prepared from petroleum. It has been observed that the use of high concentrations of such a coke in a carbon bisulfide retort results in reduced productivity and to a substantial dust carry-over from the reacting bed to downstream equipment.

Basically, both problems stem in considerable measure from the same source, i.e., reacting bed instability. Because the particles are free to move in the direction of fluid motion, beds of granular solids are generally relatively unstable in the presence of high velocity fluid up-flow. Conversely, the solids are held in place by fluid down-flow and such beds are stable. Since in the usual carbon bisulfide retort the gases admitted are flowing upwardly, the beds are unstable because of the high velocity up-flow. This is particularly true since the solid portion of the bed is removed by reaction with the gaseous sulfur, channels being formed in the solids in the direction of fluid motion. The vertical channels are much more likely to be persistent than horizontal channels whether the vertical channels are formed by up-draft or down-draft flow.

In accordance with the present invention, I provide a carbon bisulfide retort construction in which the gas flow through the solid undergoing reaction is substantially horizontal. In this fashion, the formation of channels in the solid is reduced and, in addition, the bed is much more stable.

It is in general the broad object of the present invention to provide an improved carbon bisulfide retort construction.

A further object of the present invention is to provide a carbon bisulfide retort construction in which the flow of gases through the reacting solids is substantially horizontal so that the bed of solids is quite stable.

The invention includes other objects and features of advantage, some of which, together with the foregoing, will appear hereinafter wherein the present preferred form of retort construction of this invention is disclosed. In the drawing accompanying and forming a part hereof, FIGURE 1 is a side elevation, partly in section, through a carbon bisulfide retort.

FIGURE 2 is a section taken along the line 2—2 of FIGURE 1.

FIGURE 3 is an enlarged sectional view of a form of gas filter employed.

Referring to the drawing and particularly to FIGURE 1, I have indicated a carbon bisulfide retort at 6, including a lower sulfur heating section 7, disposed in a suitable furnace structure 8, and an upper or retort reaction section 9. A boot 11 is provided for introduction of sulfur and a boot 12 for removal of ash. The carbon to be reacted is introduced through the opening 14, which is closed by a suitable cover, as generally indicated at 16, or by a star feeder, not shown. The carbon bisulfide is removed from the retort section through the outlet 17.

In accordance with this invention, means are provided in the retort section 9 to enable the sulfur vapor issuing from the sulfur vapor heating section 7 to pass horizontally through the solid carbon source packed into retort section 9. Thus, the sulfur heating section 7 includes several spaced supports 18 on which rest a supporting transverse annular cast iron ring 19 providing a support for the carbon charge in the retort section 9.

The transverse cast iron ring 19 includes an annular opening 21 centrally thereof. Mounted over this opening is a vertical sulfur vapor distributor, generally indicated at 22, and comprising a tubular element fitting over the central opening 21 in the cast iron support 19. The tubular element 22 has numerous openings 24 in the sidewall thereof to pass rising sulfur vapor transversely into the solid carbon charge placed in the retort section 9. At its upper end, the tubular element 22 is closed, as at 26, while apertures 27 are provided to permit the element to be removed through the opening 14 when it is desired to break up the residual carbon and ash formation which may have accumulated in the retort section 9 and drop this into the sulfur vapor section for removal through the boot 12.

Further in accordance with this invention, the sidewall of the retort section 9 is lined with a filter element, generally indicated at 31, and comprising a plurality of separate porous ceramic filter elements of the form shown in FIGURE 3. Each of the filter elements is substantially of a U-shape in cross section, with each leg of the U falling along a radius of the circular section of the retort section 9 so that the elements fit snugly together, as appears in FIGURE 2. The filter elements are provided in courses or tiers, the alternate courses or tiers being staggered so that carbon disulfide can pass upwardly and about the sidewall of the retort to issue through the carbon bisulfide outlet 17.

The filters are laid around the wall of the reactor section in a manner similar to the laying of circle brick and they key in to form a stable structure. The top of the filter structure is sealed with a layer of refractory circle brick 32.

In operation, the reactor is completely filled with the carbon charge up to the very top of the reactor section. The sulfur vapor travels radially from the inlet to the outlet and there is no tendency for the gas to leave the surface of the bed with the result that complete stability of the bed is achieved. The solid material above the outlet serves as a reservoir of reactant to maintain the reaction between charges. It also increases the available volume in which reaction may occur, thereby potentially improving conversion of the sulfur. The filters eliminate the dust carry-over almost completely. In addition, heat losses from the wall of the reactor are much less serious and efficient thermal insulation on the outside of the reactor becomes of less importance.

I claim:

A carbon bisulfide retort comprising a lower sulfur heating section and an upper retort section directly thereover, said sections having substantially the same cross-sectional area, a furnace completely surrounding the sides of the lower sulfur heating section providing means for supplying heat thereto, a plate separating the sulfur heating section from the retort section, said plate being solid except for a single central opening, a tubular sulfur vapor distributor sealed to said opening extending upwardly therefrom into the retort section and having a plurality of openings in the wall thereof to distribute sulfur vapor into the retort section, an opening having a removable cover at the top of the retort section, said opening providing means for supplying solid carbon to the retort section and a filter element spaced from the wall of the retort section and concentric with both the tubular distributor and the wall of the retort, said filter defining a closed, annular space between the wall and the filter, said space serving both as a passage for removing carbon bisulfide from the retort section free of ash and as an insulator to conserve heat in the said retort section, and an outlet from the annular space.

References Cited in the file of this patent

UNITED STATES PATENTS

| | | |
|---|---|---|
| 2,577,786 | MacDougall | Dec. 11, 1951 |
| 2,626,675 | Maher | Jan. 27, 1953 |
| 2,708,156 | Paoloni | May 10, 1955 |

FOREIGN PATENTS

| | | |
|---|---|---|
| 494,340 | Great Britain | Oct. 24, 1938 |